United States Patent
Drysdale et al.

(10) Patent No.: US 6,976,155 B2
(45) Date of Patent: Dec. 13, 2005

(54) METHOD AND APPARATUS FOR COMMUNICATING BETWEEN PROCESSING ENTITIES IN A MULTI-PROCESSOR

(75) Inventors: Tracy Garrett Drysdale, Chandler, AZ (US); Scott P Bobholz, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 674 days.

(21) Appl. No.: 09/880,621

(22) Filed: Jun. 12, 2001

(65) Prior Publication Data

US 2003/0084269 A1 May 1, 2003

(51) Int. Cl.[7] .............................. G06F 9/54; G06F 13/38; G06F 9/52
(52) U.S. Cl. ................... 712/225; 712/223; 712/217; 712/228; 711/145; 711/152; 711/155; 718/108; 710/61; 710/305
(58) Field of Search .................... 712/217, 223, 712/225, 228, 23, 248; 711/145, 152, 153, 150; 718/108; 710/61, 305

(56) References Cited

U.S. PATENT DOCUMENTS 5,095,523 A * 3/1992 Delaruelle et al. ............ 712/42
5,590,326 A * 12/1996 Manabe ....................... 711/150
5,909,695 A * 6/1999 Wong et al. ................. 711/133
5,913,059 A * 6/1999 Torii ............................ 718/104
6,092,175 A * 7/2000 Levy et al. .................... 712/23
6,330,661 B1 * 12/2001 Torii ............................ 712/228
6,496,909 B1 * 12/2002 Schimmel ................... 711/163
6,567,839 B1 * 5/2003 Borkenhagen et al. ...... 718/103

* cited by examiner

Primary Examiner—Daniel H. Pan
(74) Attorney, Agent, or Firm—Blakely, Sokoloff, Taylor & Zafman LLP (57) ABSTRACT

A method and apparatus for synchronizing and communicating between processing entities, such as cores or threads, in a multiprocessor. Two registers are used as a "hardware mailbox" by two processing entities of a microprocessor. A first register is used to communicate information from a first processing entity to a second processing entity, while a second register is used to communication information from the second processing entity to the first processing entity. The first and second registers are cross-decoded by the two processing entities. One or more bits in each register are used to synchronize operation of the processing entities. In a microprocessor including three or more such processing entities, a read-write register of each processing entity holds outgoing information and a read-only register of each processing entity holds incoming information. A separate logic circuit logically combines the contents of the read-write registers and stores the result in the read-only registers.

34 Claims, 5 Drawing Sheets

METHOD AND APPARATUS FOR COMMUNICATING BETWEEN PROCESSING ENTITIES IN A MULTI-PROCESSOR

FIELD OF THE INVENTION

The present invention pertains to multi-core or multi-thread microprocessors. More particularly, the present invention relates to communication between, and synchronization of, cores and threads on a multi-core or multi-thread microprocessor.

BACKGROUND OF THE INVENTION

In a multi-core or multi-thread microprocessor, it is often necessary to have communication between two or more cores or threads. For example, core to core communications may be required in the boot-up firmware (e.g., the basic input/output system, or BIOS) when certain elements of the processor are shared between the cores, such as a Level 3 (L3) cache. In such cases, it becomes necessary to control both cores during initialization or in the event of an interrupt or exception to prevent consumption of an error. Communication during initialization is frequently necessary to allow one core or thread to test and initialize shared structures while another core or thread waits for completion. It is also possible to have two or more cores or threads performing tests of different portions of the structures and to communicate the results between them.

In the case of an interrupt or exception, an interrupt/exception handler normally must communicate between the cores in order to perform recovery. In addition, firmware routines often must run concurrently on each core of a dual core processor or, potentially, on each thread of a dual thread processor, necessitating communication between the two processor cores in order to synchronize progress. Operating System (OS) resources are normally not available to the boot-up firmware, nor is access to memory during portions of firmware execution. Therefore, an alternative mechanism is needed for core to core or thread to thread communication.

One previous approach is to use shared registers to communicate between cores. However, great care must be taken with this approach to coordinate when each core is reading or writing the shared registers, to avoid conflicts and invalid data. A hardware semaphore may be used to provide this coordination. However, the use of a hardware semaphore tends to complicate the firmware and increases the likelihood of software errors ("bugs"). In particular, it prevents the use of identical code paths by each core or thread when executing firmware, by requiring various branches and/or jumps to account for proper addressing of registers. Similar problems exist with respect to thread to thread communications in a multi-thread processor. Hence, what is needed is a better technique for core to core or thread to thread communications in a multi-core or multi-thread microprocessor.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Described herein are a method and apparatus which allow synchronization and communication between multiple cores in a multi-core microprocessor or between multiple threads in a multi-thread microprocessor (or simply, "processor"). To facilitate description, the term "processing entity" is used in this specification to mean either a core or a thread of a microprocessor. Although the terms "core" or "thread" are mentioned separately in many instances throughout this description, it will be understood that in most if not all such instances, the principle being described applies equally to the other type of processing entity which is not explicitly mentioned.

Also, in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc described in one embodiment may also be included in other embodiments. Thus, the present invention can include any variety of combinations and/or integrations of the embodiments described herein.

As described in greater detail below, two registers can be used as a "hardware mailbox" by two processing entities of a microprocessor. One register is used to communicate information only from a first processing entity to a second processing entity, while the other register is used to communication information only from the second processing entity to the first processing entity. The two registers are cross-decoded by the two processing entities. One or more bits in each register are used to synchronize operation of the processing entities during execution of firmware. In a microprocessor including three or more such processing entities, a read-write register in each entity can be used to hold outgoing information while a read-only register in each entity is used to hold incoming information. A separate logic circuit separate from the processing entities logically combines the contents of the read-write registers from all of the processing entities and stores the result in the read-only registers all of the processing entities.

The hardware mailbox simplifies core to core (or thread to thread) communications in a multi-core (or multi-thread), processor by permitting the firmware code for communication to be written in a way that is independent of the core or thread on which the code is executing. It does this by eliminating bit or register addressing in software that is dependent upon core or thread ID.

As noted above, the mechanism described herein is equally applicable to multi-core processors and multi-thread processors (and, therefore, to processors that have multiple cores and multiple threads). Likewise, it is equally applicable to simultaneous multi-threading (SMT) and switch on event multi-threading (SoEMT). To facilitate description, the remainder of this description refers mostly to the multi-core scenario. The multi-thread scenario is essentially identical, except that the addresses of the mailbox registers are additionally qualified by the thread identity (ID) automatically by the hardware. This implementation allows the same firmware binary to run on every core or thread without modification for addressing of registers.

In one embodiment, the hardware mailbox is defined as a pair of read-write registers (sized appropriately for the processor or task) accessible to both cores in a shared register space (referred to herein as "XR" space) of the processor, with special decoding requirements. For example, the mailbox may be defined as two 64-bit registers in XR space called A and B, respectively. A first core, Core 0, decodes register A as XRn (where n is an integer) and will decode register B as XR(n+1). A second core, Core 1, decodes register A as XR(n+1) and will decode register B as XRn. Writes to the same physical register (A or B) by both cores are prevented by software design, and hardware may treat this case in any manner. Reads of the same physical register return valid data to both cores. A write and a read to the same physical register at the same time should result in the write always occurring, and the read may return either the original register contents or the new register contents, but it must be valid data. This implementation is desirable, since the core or thread reading the register is polling the data, and a short delay is acceptable. The core or thread writing a register will not check that the write was successful, so hardware will ensure that the write occurred.

Each mailbox register pair is "cross-decoded" between the cores. In the case of a multi-thread processor, the thread identity (ID) would be used in the decoding of the registers. In terms of software, there is no difference in the mechanics of operation between implementation on a multi-core processor and implementation on a multi-thread processor.

Below is an example of the cross-decoding for a mailbox pair in the shared "XR" space, for a dual-core (or dual-thread) processor:

|  | Core 0 (or Thread 0) Decoding | Core 1 (or Thread 1) Decoding |
| --- | --- | --- |
| Physical Register A | XR9 | XR10 |
| Physical Register B | XR10 | XR9 |

In the above example, XR9 is defined as the outgoing mailbox, or SEND register, in both cores (or threads). XR10 is defined as the corresponding incoming mailbox, or RECEIVE register, in both cores (or threads). Note that the decoding in hardware allows the software to be identical on both cores or threads and will correctly address the send and receive registers.

Of course, more than one pair of mailbox registers may be defined in a processor, depending on the specific nature of the processor or the tasks to be accomplished. A processor with two pairs of mailbox registers might use the following decoding, for example:

|  | Core 0 (or Thread 0) Decoding | Core 1 (or Thread 1) Decoding |
| --- | --- | --- |
| Physical Register A | XR9 | XR10 |
| Physical Register B | XR10 | XR9 |
| Physical Register C | XR11 | XR12 |
| Physical Register D | XR12 | XR11 |

In the above example, XR9 and XR11 are defined as outgoing mailboxes, or SEND registers, in both cores (or threads). XR10 and XR12 are defined as the corresponding incoming mailboxes, or RECEIVE registers, in both cores (or threads). Again, the decoding in hardware allows the software to be identical on both cores or threads and will correctly address the send and receive registers.

Figure 1:
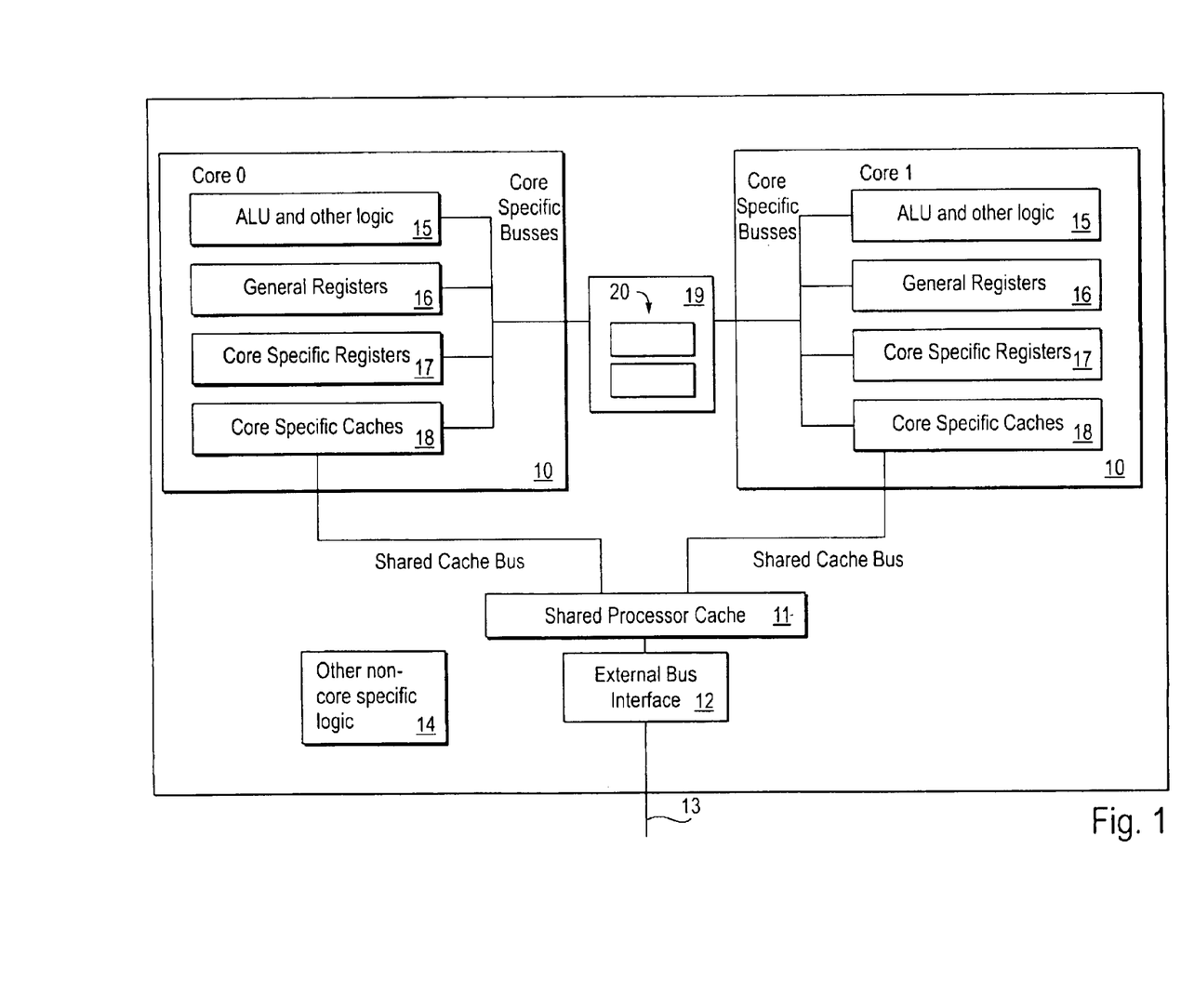
FIG. 1 is a block diagram of a dual-core (or dual-thread) microprocessor which includes a hardware mailbox.

FIG. 1 shows an example of a dual-core microprocessor in which the hardware mailbox can be implemented. As shown, the processor includes two cores ("Core 0" and "Core 1") 10, a cache memory 11 shared by the two cores, an external bus interface 12 to couple the processor to an external bus 13. The processor also includes other, non-core-specific logic 14, the details of which are not germane to the present invention. Each core 10 includes an arithmetic logic unit (ALU) and other logic 15, various general-purpose (GP) registers 16, various core-specific registers 17, and various core-specific cache memories. Two or more registers 19 are coupled between, and shared by, the two cores 10. The shared registers 19 include at least one pair of mailbox registers 20 defined as described above.

Thus, the approach described above provides for the definition, in firmware, of an outgoing mailbox to the other core, and a receive mailbox from the other core. This approach enables identical code paths on each core of a dual-core processor (or both threads in a dual-thread processor) in the boot-up firmware. The software does not have to determine the code path based on the core ID, which would be the case if registers used for core to core communication were linearly decoded. If registers for core to core communication were linearly decoded, then each core would have to choose the correct register to write messages to, and read messages from, depending on its core ID. With the cross-decoded "mailbox", the firmware always writes the same register to send a message, and always reads the same register to receive a message, regardless of which core the firmware is running on. This approach greatly simplifies the firmware design and reduces the likelihood of software errors ("bugs"). The mailbox design allows asynchronous signals between cores, and with proper software design, can be used for synchronization between cores, as described below.

Figure 2:
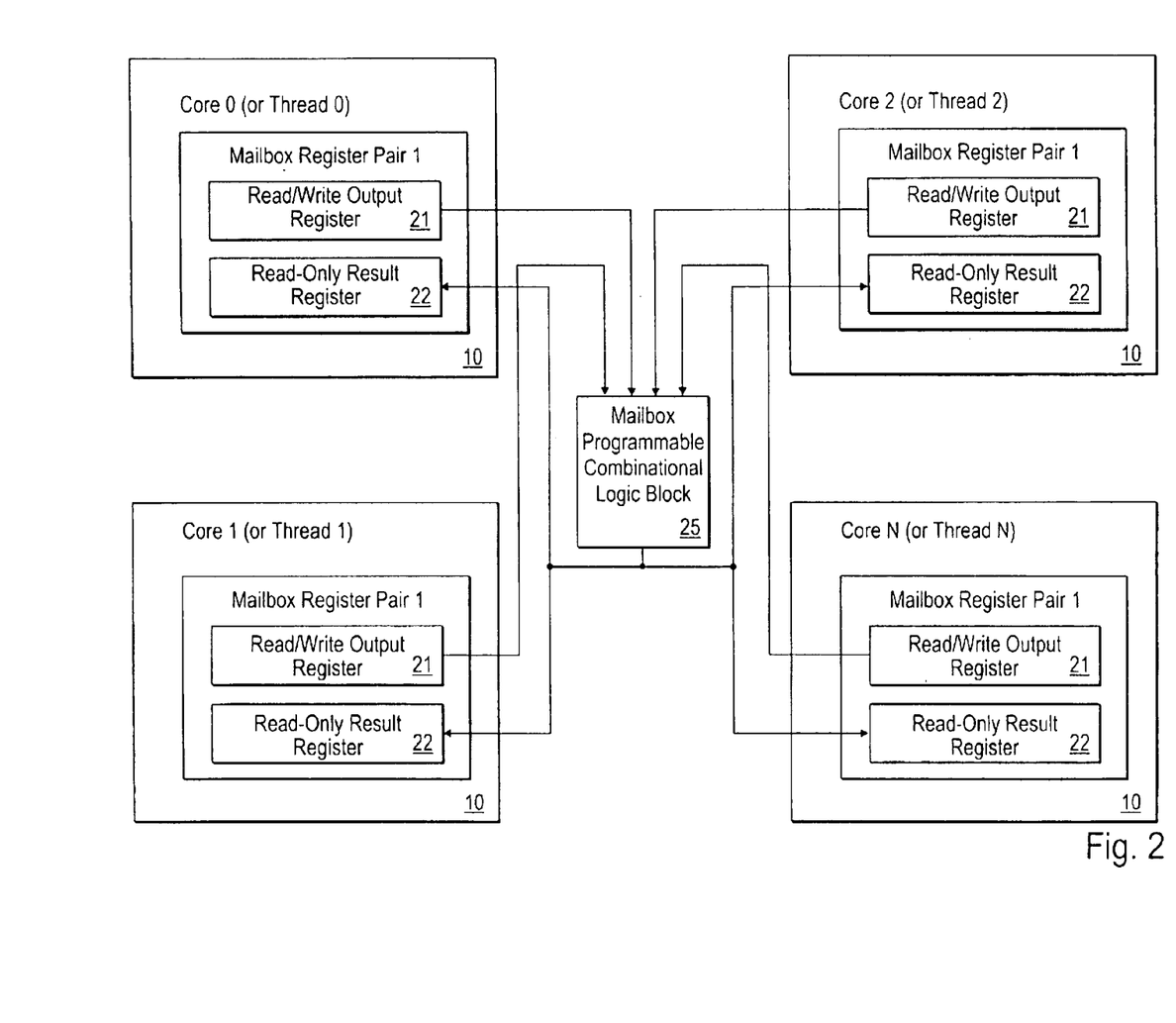
FIG. 2 is a block diagram of a multi-core (or multi-thread) microprocessor which has N cores and which includes a hardware mailbox.

The above-described concept of a hardware mailbox may also be extended to processors with three or more cores or threads. FIG. 2 shows an example of such an embodiment. Note, however, that this approach can also be used in a processor with two cores (or threads). In this embodiment, each core (or thread) 10 has a pair of registers for each defined mailbox, i.e., a read-write output register 21 and a read-only input register 22. The read-write registers 21 and the read-only 22 registers may be considered logically part of their respective cores 10, and they may be (but do not have to be) physically implemented within the cores 10. The bits written in the read-write register 21 of each core are logically combined by a programmable logic block 25 located in the processor package but outside of each core (i.e., in the "non-core"). The result of the logic combination of the inputs is then made available in the read-only register 22 in each core 10 for the mailbox pair. The bits are combined in a bit-wise fashion. In other words, bit position 0 from each input (read-write) register 21 is logically combined by the logic and placed in bit 0 of the read-only registers 22. The hardware does this for all bit position 1's and stores in bit position 1 of the read-only register, the same for all bit position 2's, etc.

The read-only register contents are the same when read by each of the N cores. The combinational logic in logic block 25 can be the same for each bit or can be varied in groups of bits depending on the requirements of the implementation. Additionally, the logic combination of bits can be programmable at runtime.

The following description details the programmable logic scenario. Implementing fixed logic combinations is trivial, and this embodiment can be easily modified to allow the fixed logic combination. Essentially any number of mailbox "sets" can be implemented, such that each core can have multiple mailboxes. Each mailbox can define differing combinatorial logic or differing combinatorial logic per bit(s) within a mailbox. Using mailbox bits defined with different logic combinations, for instance, AND and OR operations, allows the mailboxes to be used by the multiple cores to define any logic necessary for communication or signaling between cores.

Figure 3:
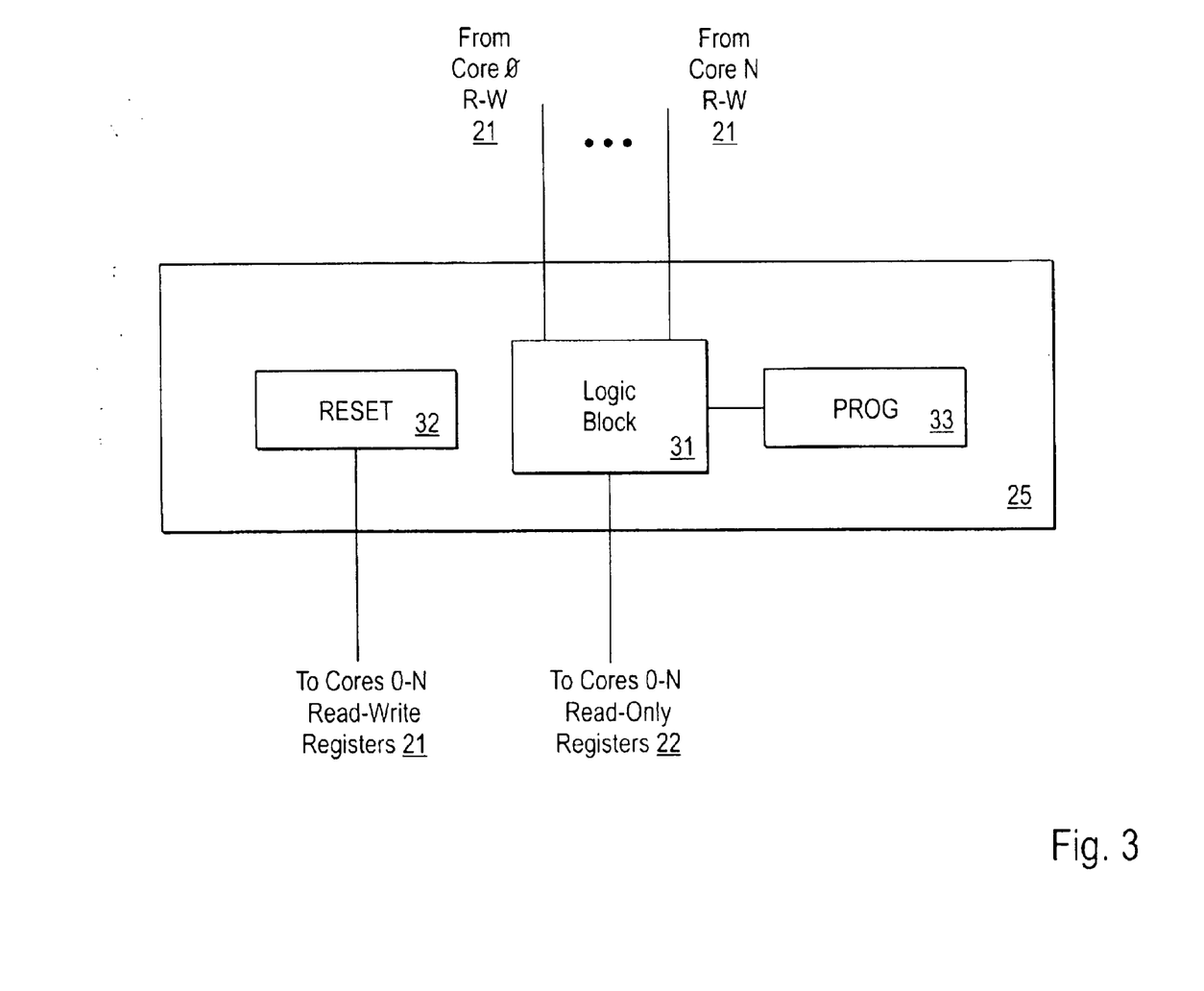
FIG. 3 illustrates the non-core logic block of the microprocessor of FIG. 2.

As shown in FIG. 3, in one embodiment the programmable combinational logic block 25 contains the logic 31 to implement the bit-wise logical combination of bits. It also contains at least two registers 32 and 33. One register 32 is write-only and when written to, will cause the read-write registers of the cores to be updated to a predefined RESET condition. The other register 33 is a logic selection (programming, or "PROG") register which defines the logic operation performed by the logic 31. For example, firmware writing a logic '1' to a bit in the PROG register 33 may define the corresponding bit in the read-write registers to be combined in a logical AND fashion, while writing a logic '0' to a bit causes the corresponding bit in the read-write registers to be combined in a logical OR fashion. In the general case, the logic 31 can be defined to do any bit-wise operation, and the PROG register 33 could enable selection between any two operations. Additionally, it is also be possible to have more than one logic PROG 33, which will allow more than one logic selection bit for each bit in the read-write registers 21 of the cores 10. Having two PROG registers 33, for example, would allow choosing between up to four different types of logic combinations.

The RESET register 32 in the logic block 25 is used to set a specific reset condition to the read-write registers 21 of the cores 10. This may be needed in the event that one of the cores 10 has been shut down for some reason. Having a specific reset condition prevents deadlock or false positives. For instance, if a bit was programmed for a logical AND operation, the reset condition should be set to TRUE so that an inoperable thread or core will never impede progress. Likewise, for the OR condition, the bit should be reset to 0 so as not to indicate a false positive. Proper choice of the logic selection bit values will allow the selection register to also be used as the initialization value when the reset register 32 is written.

As with the dual-core embodiment, this approach enables the firmware design to be simplified, because it reduces the need for multiple comparison operations within the software. It allows the definition in the firmware of a outgoing communications port along with an incoming response. Multiple mailboxes can be defined to promote simple software design. Programmability of the desired bit-wise logic combination also increases the flexibility of the design.

The above-described techniques can be used to facilitate synchronization between cores or threads of a processor, as will now be described. A synchronization approach based on the hardware mailbox will now be described. The synchronization technique is referred to herein as a software synchronization "gate". For purposes of explanation, it will be assumed that a mailbox pair consists of cross-decoded registers XR9 and XR10, as described above, where XR9 is the send mailbox MS and XR10 is the receive mailbox MR. Multiple routines may use the same gate mechanism as long as it is not possible for one routine to run as a result of an interruption event while another routine is running that uses the same gate. This requires, for instance, that the firmware interrupt handler define gate mechanisms purely for its own use, since the interrupt handler may interrupt any other firmware routine.

In one embodiment, each gate consists of three bits reserved in identical bit positions in the MS and MR register of each core. These bits will be defined as a Ready to Proceed (RP) bit, a gate on/off (gOn) bit, and a parity (gP) bit. The gOn bit is used to initialize the gate and to turn it off at function entry and exit. This capability increases the robustness of the code by always guaranteeing a known start up state for use of the gate. It also allows the interrupt handler to be able to determine if a gate was in use when an interrupt occurred. (This may or may not be used in the interrupt handler to reset gates to an off position if the routine causing an interrupt must be terminated.) The gP bit is a parity bit used as a soft error detection mechanism. In one embodiment, the gP bit is always written to make the 3-bit field have even parity. Even parity is chosen along with state definitions to result in the off state being all binary zeros. This results in easier initialization during the reset control flow of firmware.

Operation of the synchronization gate is as follow. When a core reaches a predefined synchronization point in the firmware code, it changes the RP bit in its send mailbox MS and then waits for the other core to change its RP bit before proceeding. Therefore, a write of a gate bit is always followed by a spin loop reading the gate bit from the other core. When the other core (running the same code path) updates its gate bits in its MS (send mailbox) register, the first core will proceed from the spin loop, as will the second core.

Figure 4:
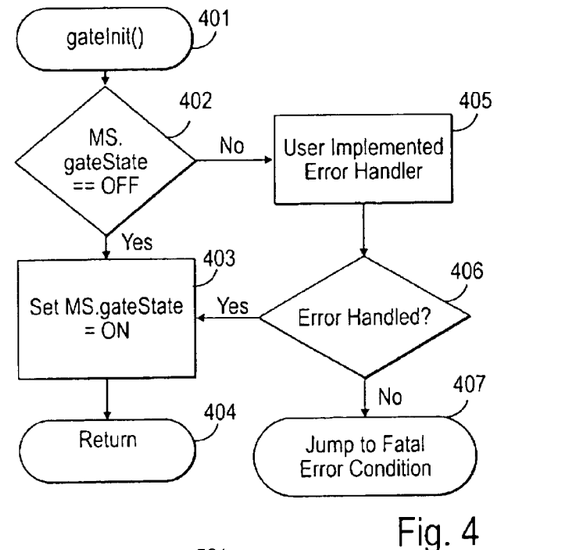
FIG. 4 is a flow diagram showing a process for initializing a software synchronization gate.
Figure 5:
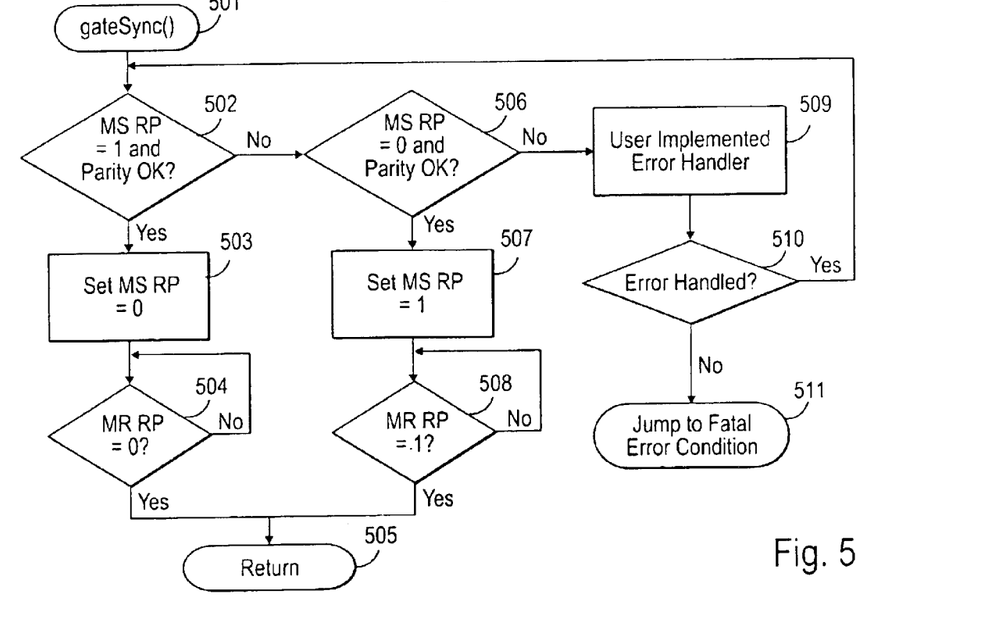
FIG. 5 is a flow diagram showing a process for carrying out synchronization using a software synchronization gate.
Figure 6:
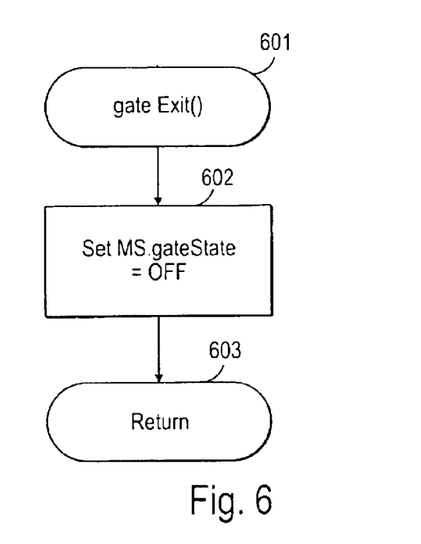
FIG. 6 is a flow diagram showing a process for turning off a software synchronization gate.

More specifically, the gate is operated by first initializing the gate, then carrying out one or more synchronizations, and then turning off the gate. In one embodiment, these actions are implemented using three macros (or functions), defined respectively as gateInit( ), gateSync( ) and gateExit( ), which must be called in that order (although gateSync( ) maybe called more than once). FIGS. 4, 5 and 6 show the process of the three macros, according to one embodiment.

Referring first to FIG. 4, the gate initialization process is shown. In response to a call to the gateInit( ) macro at block 401, the process determines at block 402 whether the gate state ("MS.gateState") of the send mailbox MS of the core executing this process is in the OFF state. For purposes of this process, the OFF state may be defined as gP=0, gOn=0, and RP=0. If MS.gateState is in the OFF state, it is set to the ON state at block 403, and the process returns to the point from which it was called at block 404. For purposes of this process, the ON state may be defined as gP=1, gOn=1, and RP=0. If MS.gateState is already in the ON state at block 402, then a user-implemented error handler is invoked at block 405. Following block 405, if the error was handled (block 406), the process branches to block 403; otherwise, at block 407 the process jumps to code designed to handle a fatal error condition.

FIG. 5 shows an example of the synchronization process of the gateSync( ) macro. In response to a call to the gateSync( ) macro at block 501, the process determines at block 502 whether the RP bit of the send mailbox MS of the core executing this process is in logic state '1' with correct parity. It is assumed, for purposes of describing this process, that the gate is in the ON state (gOn=1). If the RP bit of the send mailbox MS is in the '1' state with correct parity at block 502, then it is set to the '0' state at block 503. The process then continuously checks at block 504 whether the state of the RP bit of the core's receive mailbox MR has been set to the '0' state, and returns at block 505 to the point from which the process was called only when that condition becomes true.

If on the other hand RP of the send mailbox MS is determined not to be in the '1' state with correct parity at block 502, then the process determines at block 506 whether it is in the '0' state with correct parity. If so, it is set to the '1' state at block 507. The process then continuously checks at block 507 whether the RP bit of the core's receive mailbox MR has been set to the '1' state, and returns at block 505 to the point from which the process was called only when that condition becomes true.

If the outcomes of blocks 502 and 506 indicate the parity bit gP is not set to the correct state, then a user-implemented error handler is invoked at block 509. Following block 509, if the error was handled (block 510), the process loops back to block 502; otherwise, at block 511 the process jumps to code designed to handle a fatal error condition.

FIG. 6 shows an example of the gateExit macro. In response to a call to the gateExit( ) macro at block 601, MS.gateState is set to the OFF state at block 602. For purposes of this process, the OFF state may be defined as gP=0, gOn=0, and RP=0. The process then returns to the point from which the process was called, at block 603.

Note that these macros can be easily modified for use in a processor with three or more cores (or threads), in accordance with the embodiment of FIG. 2. For example, for three or more cores, blocks 504 and 508 in the routine of FIG. 5 can each be modified to determine whether MR.gateState indicates an bits of the MR register (the read-only register) are equal, which indicates that all cores are ready to proceed.

The synchronization gate can be implemented in firmware repetitively, as needed, using the three macros described above, which can be easily called by the programmer. An implementation of the macros is shown in the following in C-language-like psuedocode (note that macros can be written that implement the functionality of fewer transitions while hiding the details from the programmer, and maintaining the functional correctness necessary to prevent race conditions):

```
void gateInit (MS,            // XR index of send register
               MR,            // XR index of receive register
               RPBitPosition) // RP bit position
{
    if (MS.gateState != OffState)     // OffState => gP=0, gOn=0, RP=0
    {
        // MCA or BINIT, or log and proceed, or ignore completely
    }
    // initialize to on state 0
    MS.gateState = OnState0           // OnState0 => gP=1, gOn=1, RP=0
}
void gateSync (MS,            // XR index of send register
               MR,            // XR index of receive register
               RPBitPosition) // RP bit position
{
    // Synchronize with other core
    if (MS.gateState == OnState0)
    {
        MS.gateState == OnState1;  // OnState1 => gP=0, gOn=1, RP=1
        while (MR.gateState != OnState1);  // wait for other core
    }
    else if (MS.gateState == OnState1)
    {
        MS.gateState == OnState0;  // OnState0 => gP=1, gOn=1, RP=0
        while (MR.gateState != OnState0);  // wait for other core
    }
    else
    {
        // Error detected: User Option to decide what lengths to go to, to recover or
abort
    }
}
void gateExit (MS,            // XR index of send register
               MR,            // XR index of receive register
               RPBitPosition) // RP bit position
{
    // set to off state
    MS.gateState = OffState       ;  // OffState => gP=0, gOn=0, RP=0
}
```

For illustration purposes, it may be assumed that the RP bit is bit position 0, gOn is bit position 1, and gP is bit position 2 in the MS and MR registers, although in general there is no requirement that this be the case. Note that if the hardware mailbox is larger (in terms of bits) than the write boundary of the processor for purposes of writing the mailbox, then all three gate bits (RP, gOn, and gP) must be contained within a single word in the mailbox to prevent data coherency problems.

The following C-like psuedocode shows an example of the use of hardware mailboxes for core to core communication and software gates for synchronization in a self test flow during boot up of a processor. Note that whether the software gates are used to synchronized information transfer depends entirely upon the intent of the software developer.

```
#define      MS        XR9      // Mailbox send
#define      MR        XR10     // Mailbox receive
void SelfTestFlow (void)
{
    // Initialize Gate before use
    gateInit ( MS,                // XR index of send register
               MR,                // XR index of receive register
               BitPositionRP);    // RP bit position
    Result = PerformTestA();
    SetSendMailboxBit(Result, TestA_BIT_NUMBER, MS);
    Result = PerformTestB();
    SetSendMailboxBit(Result, TestB_BIT_NUMBER, MS);
    Result = PerformTestC();
    SetSendMailboxBit(Result, TestC_BIT_NUMBER, MS);
    // sync point - Wait for Tests A, B, and C to complete on other core
    gateSync ( MS,                // XR index of send register
               MR,                // XR index of receive register
               BitPositionRP);    // RP bit position
    Result = PerformTestD();
    SetSendMailboxBit(Result, TestD_BIT_NUMBER, MS);
    Result = PerformTestE();
    SetSendMailboxBit(Result, TestE_BIT_NUMBER, MS);
    Result = PerformTestF();
    SetSendMailboxBit(Result, TestF_BIT_NUMBER, MS);
    // sync point - Wait for Tests D, E, and F to complete on other core
    gateSync ( MS,                // XR index of send register
               MR,                // XR index of receive register
               BitPositionRP);    // RP bit position
    // Code below illustrates communication that is one way with return
acknowledgement
    if (CoreID == 0)
    {
        // Run these tests on Primary core only
        Result = PerformPrimaryCoreTest1( );
        SetSendMailboxBit(Result, Test1_BIT_NUMBER, MS);
        Result = PerformPrimaryCoreTest2( );
        SetSendMailboxBit(Result, Test2_BIT_NUMBER, MS);
        // sync point - Tell Core 1 that core 0 specific tests are complete
        gateSync ( MS,             // XR index of send register
                   MR,             // XR index of receive register
                   BitPositionRP); // RP bit position
    {
    else
    {
        // wait for core 0 specific tests to complete
        gateSync ( MS,             // XR index of send register
                   MR,             // XR index of receive register
                   BitPositionRP); // RP bit position
    }
    // call gate exit to turn off gate use
    gateExit ( MS,                 // XR index of send register
               MR,                 // XR index of receive register
               BitPositionRP);     // RP bit position
    // Exit Self Test
}
void SetSendMailboxBit(
           BOOL Value,       // 0 or 1
           int bitPosition,  // bit position to write
           MailBox Index)    // Mailbox to write
{
```

-continued

```
    int temp; // temp variable
    // do read modify write of Mailbox
    temp = ReadMSR(Index);
    temp = temp & ~(1 << bitPosition);   // clear bit that will be written
    temp = temp | (Value << bitposition); // set bit to Value
    WriteMSR(temp, Index);               // write new value to Mailbox
}
```

Note that calling the macros (or functions) out of the intended order can result in undetermined behavior or race conditions. It is possible to design the macros such that certain errors can be found at compile time. It is also possible to add debug code to the macros that can find runtime errors. Note that it may be advisable to implement compile time checking, although it cannot be designed to catch all possible errors. Therefore, it may further be advisable, given enough bits in the hardware mailbox registers, to have a gate defined for each function or sets of like functions requiring core to core communication.

The parity bit and error checking in the gateInit macro will catch single bit errors due to a single event upset. The user may implement other error recovery or reporting as deemed appropriate for the code using the gates. It should also be noted that more than three bits can be used to implement a gate, which may provide greater error protection than just three bits. As one example, eight bits might be used to encode 255 possible gate states.

Thus, the above-described synchronization approach is resistant to single event upset resulting in deadlock situations by virtue of its initialization, and exit routines exist, as well as the actual synchronization calls. The implementation is also resistant to handler-induced loss of synchronization, since gates are re-synchronized before being used. Also, different levels of recovery code can be implemented when an error is detected. The level of error recovery implemented is not as important as the fact that the errors can be caught and dealt with in some manner reasonable for the given situation.

Figure 7:
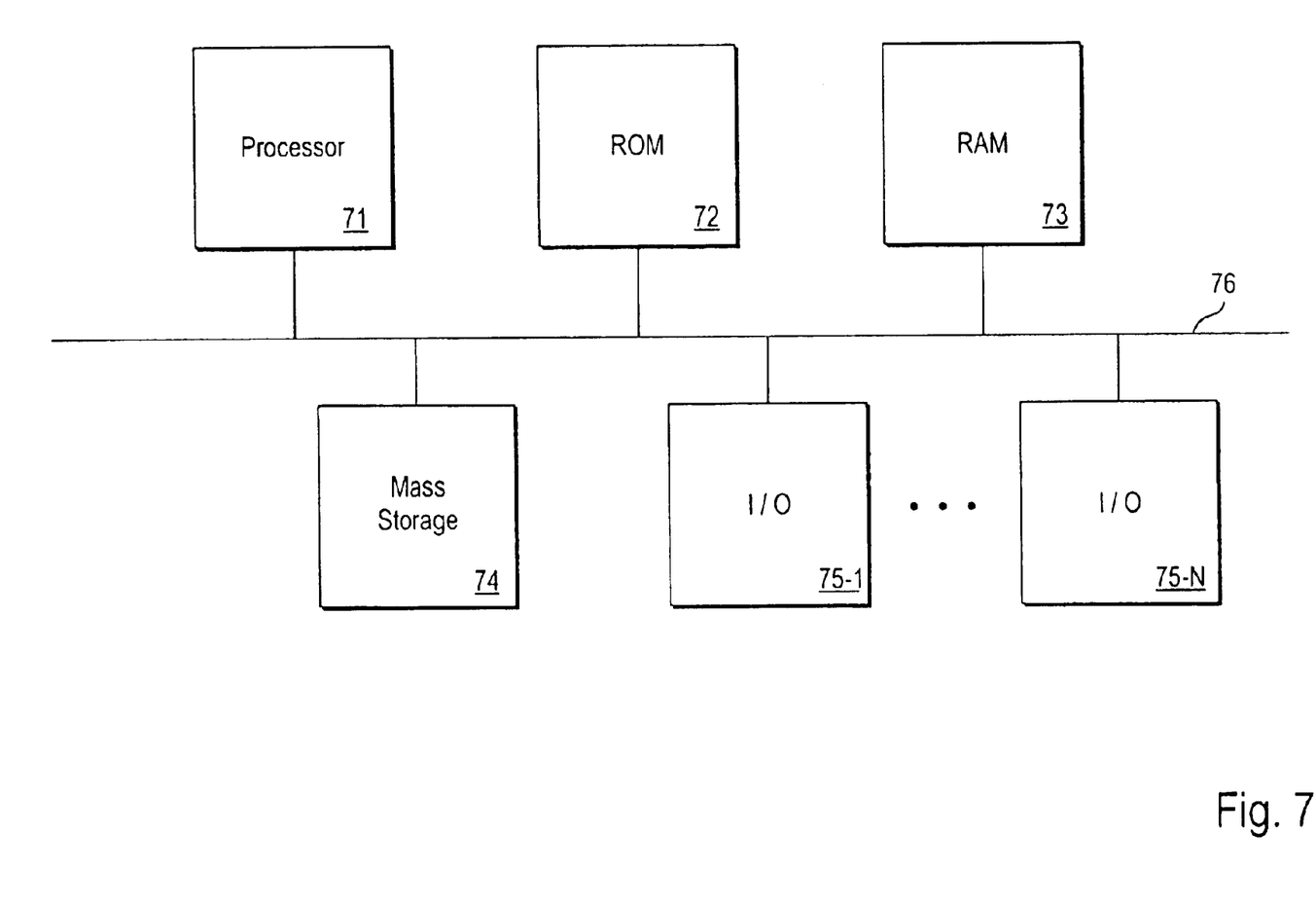
FIG. 7 is a high-level block diagram of a processing system which may include a multi-core or multi-thread microprocessor.

FIG. 7 illustrates at a high level a processing system in which a multi-core and/or multi-thread processor such as described above can be implemented. Note that FIG. 7 is not intended to represent any one specific physical arrangement of components, as such details are not germane to the present invention and are well within the knowledge of those skilled in the art. The illustrated processing system includes a processor 71, i.e. a central processing unit (CPU), read-only memory (ROM) 72, random access memory (RAM) 73, each connected to a bus system 76. The processor 71 may be a multi-core and/or multi-thread processor such as described above and may be a programmable, general-purpose or special-purpose microprocessors or digital signal processors (DSPs), for example. Firmware to be executed by the processor 71 may be stored in ROM 72.

The bus system 76 includes one or more buses, which may be connected to each other through various bridges, controllers and/or adapters, such as are well-known in the art. For example, the bus system 76 may include a "system bus", which may be connected through one or more adapters to one or more expansion buses, such as a Peripheral Component Interconnect (PCI) bus, industry standard architecture (ISA) bus, small computer system interface (SCSI) bus, universal serial bus (USB), or Institute of Electrical and Electronics Engineers (IEEE) standard 1392 bus (sometimes referred to as "Firewire").

Also coupled to the bus system 76 are a mass storage device 74 and a number (N) of input/output (I/O) devices 75-1 through 75-N, which may include one or more devices such as a keyboard, a pointing device, a monitor, and a data communication device (e.g., a modem). Mass storage device 74 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

Thus, a method and apparatus for synchronizing and communicating between multiple cores and/or multiple threads in a microprocessor have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A microprocessor comprising:
   a first core;
   a second core;
   a first register to communicate information from the first core to the second core, wherein the first register is decoded by the first core to have a first register name and is decoded by the second core to have a second register name; and
   a second register to communicate information from the second core to the first core, wherein the second register is decoded by the first core to have the second register name and decoded by the second core to have the first register name.

2. A microprocessor as recited in claim 1, wherein the first register is to communicate information only from the first core to the second core, and the second register is to communicate information only from the second core to the first core.

3. A microprocessor as recited in claim 1, wherein the first and second registers each include a bit used to synchronize operation of the first core and the second core.

4. A multi-thread microprocessor comprising:
   a core to execute a first thread concurrently with a second thread;
   a first register to communicate information from the first thread to the second thread, wherein the first register is decoded by the first thread to have a first register name and is decoded by the second thread to have a second register name; and
   a second register to communicate information from the second thread to the first thread, wherein the second register is decoded by the first thread to have the second register name and decoded by the second thread to have the first register name.

5. A microprocessor as recited in claim 4, wherein the first register is to communicate information only from the first thread to the second thread, and the second register is to communicate information only from the second thread to the first thread.

6. A microprocessor as recited in claim 4, wherein the first and second registers each include a bit used to synchronize operation of the first thread and the second thread.

7. A computer system comprising:
   a microprocessor, the microprocessor including
      a first core,
      a second core,
      a first register to communicate information only from the first core to the second core, wherein the first register is decoded by the first core to have a first register name and is decoded by the second core to have a second register name,
      a second register to communicate information only from the second core to the first core, wherein the second register is decoded by the first core to have the second register name and decoded by the second core to have the first register name,
      and
      a shared cache coupled to the first core and the second core;
   a random access memory coupled to the microprocessor, and
   a read-only memory coupled to the microprocessor and storing firmware for execution by the microprocessor.

8. A computer system as recited in claim 7, wherein the first register is to communicate information only from the first thread to the second thread, and the second register is to communicate information only from the second thread to the first thread.

9. A computer system as recited in claim 7, wherein the first and second registers each include a bit used to synchronize operation of the first core and the second core.

10. A multi-core microprocessor comprising:
    a plurality of cores, each of the cores having associated therewith a read-only register to enable the core to receive information relating to another core of the microprocessor and a read-write register to enable the core to output information for use by another core of the microprocessor; and
    a logic circuit to apply a logic operation to contents of the read-write register of each of the cores and to store a result of the logic operation in the read-only register of each of the cores.

11. A microprocessor as recited in claim 10, wherein the logic circuit applies the logic operation in a bit-wise manner to said contents of the read-write register of each of the cores.

12. A microprocessor as recited in claim 10, wherein the logic circuit is programmable to select the logic operation.

13. A microprocessor as recited in claim 12, wherein the logic circuit comprises a register, the contents of which determine the logic operation in a bit-wise manner.

14. A multi-thread microprocessor comprising:
    a core to execute a first thread concurrently with a second thread; and
    a plurality of registers, including a read-only register for each of the threads to enable the thread to receive information relating to another thread of the microprocessor and a read-write register for each of the threads to enable the thread to output information for use by another thread of the microprocessor; and
    a logic circuit to apply a logic operation to contents of the read-write register of each of the threads and to store a result of the logic operation in the read-only register of each of the threads.

15. A microprocessor as recited in claim 14, wherein the logic circuit applies the logic operation in a bit-wise manner to said contents of the read-write register of each of the threads.

16. A microprocessor as recited in claim 14, wherein the logic circuit is programmable to select the logic operation.

17. A microprocessor as recited in claim 16, wherein the logic circuit comprises a register, the contents of which determine the logic operation in a bit-wise manner.

18. A multi-core microprocessor comprising:
    a plurality of cores, each of the cores having associated therewith
       a read-only register to enable the core to receive information relating to another core of the microprocessor, and a read-write register to enable the core to output information for use by another core of the microprocessor; and a logic circuit to apply a logic operation to contents of the read-write register of each of the cores and to store a result of the logic operation in the read-only register of each of the cores.

19. A microprocessor as recited in claim 18, wherein the logic circuit applies the logic operation in a bit-wise manner to said contents of the read-write register of each of the cores.

20. A microprocessor as recited in claim 18, wherein the logic circuit is programmable to select the logic operation.

21. A microprocessor as recited in claim 20, wherein the logic circuit comprises a register, the contents of which determine the logic operation in a bit-wise manner.

22. A computer system comprising:
a microprocessor including a plurality of cores, each of the cores having associated therewith
a read-only register to enable the core to receive information relating to another core of the microprocessor, and
a read-write register to enable the core to output information for use by another core of the microprocessor, and
a logic circuit to apply a logic operation to contents of the read-write register of each of the cores and to store a result of the logic operation in the read-only register of each of the cores, and
a random access memory coupled to the microprocessor; and
a read-only memory coupled to the microprocessor and storing firmware for execution by the microprocessor.

23. A computer system as recited in claim 22, wherein the logic circuit applies the logic operation in a bit-wise manner to said contents of the read-write register of each of the cores.

24. A computer system as recited in claim 22, wherein the logic circuit is programmable to select the logic operation.

25. A computer system as recited in claim 24, wherein the logic circuit comprises a register, the contents of which determine the logic operation in a bit-wise manner.

26. A microprocessor comprising:
a first core;
a second core;
a first register to communicate information only from the first core to the second core, wherein the first register includes a plurality of bits used to synchronization operation of the first core and the second core; and
a second register to communicate information only from the second core to the first core, wherein the second register includes a plurality of bits used to synchronize operation of the first core and the second core.

27. A microprocessor as recited in claim 26, wherein the first register and the second register are cross-decoded by the first core and the second core.

28. A microprocessor as recited in claim 27, wherein:
the first core is configured to execute a predetermined synchronization instruction by setting a predetermined bit of the plurality of bits in the first register to a predetermined value and then waiting until a corresponding predetermined bit of the plurality of bits in the second register is set to a predetermined value before proceeding; and
the second core is configured to execute the predetermined synchronization instruction by setting a predetermined bit of the plurality of bits in the second register to a predetermined value and then waiting until a corresponding predetermined bit of the plurality of bits in the first register is set to a predetermined value before proceeding.

29. An apparatus comprising:
a first register to communicate information from a first processing entity of a microprocessor to a second processing entity of the microprocessor;
a second register to communicate information from the second processing entity to the first processing entity;
means for cross-decoding the first register and the second register between the first processing entity and the second processing entity;
means for causing the first processing entity to set a predetermined bit of a plurality of bits in the first register to a predetermined value;
means for causing the first processing entity to wait until a corresponding predetermined bit of the plurality of bits in the second register is set to a predetermined value before proceeding.

30. An apparatus as recited in claim 29, wherein the first and second processing entities are separate cores of the microprocessor.

31. An apparatus as recited in claim 29, wherein the first and second processing entitles are separate threads of the microprocessor.

32. A computer system comprising:
a microprocessor including
a first core;
a second core;
a first register to communicate information only from the first core to the second core, wherein the first register includes a plurality of bits used to synchronize operation of the first core and the second core; and
a second register to communicate information only from the second core to the first core, wherein the second register includes a plurality of bits used to synchronize operation of the first core and the second core;
and
a shared cache coupled to the first core and the second core;
a random access memory coupled to the microprocessor, and
a read-only memory coupled to the microprocessor and storing firmware for execution by the microprocessor.

33. A computer system as recited in claim 32, wherein the first register and the second register are cross-decoded by the first core and the second core.

34. A computer system as recited in claim 33, wherein:
the first core is configured to execute a predetermined synchronization instruction by setting a predetermined bit of the plurality of bits in the first register to a predetermined value and then waiting until a corresponding predetermined bit of the plurality of bits in the second register is set to a predetermined value before proceeding; and
the second core is configured to execute the predetermined synchronization instruction by setting a predetermined bit of the plurality of bits in the second register to a predetermined value and then waiting until a corresponding predetermined bit of the plurality of bits in the first register is set to a predetermined value before proceeding.

* * * * *

UNITED STATES PATENT AND TRADEMARK OFFICE
CERTIFICATE OF CORRECTION

| | | |
|---|---|---|
| PATENT NO. | : 6,976,155 B2 | Page 1 of 1 |
| APPLICATION NO. | : 09/880621 | |
| DATED | : December 13, 2005 | |
| INVENTOR(S) | : Drysdale et al. | |

It is certified that error appears in the above-identified patent and that said Letters Patent is hereby corrected as shown below:

In column 13, at line 48, delete "synchronization" and insert --synchronize--.

Signed and Sealed this

Fourteenth Day of November, 2006

JON W. DUDAS
*Director of the United States Patent and Trademark Office*